United States Patent
Stoupis et al.

(10) Patent No.: US 7,558,703 B2
(45) Date of Patent: Jul. 7, 2009

(54) ELECTRICAL SUBSTATION MONITORING AND DIAGNOSTICS

(75) Inventors: James Stoupis, Duham, NC (US); Zhenyuan Wang, Apex, NC (US); Ajay C. Madwesh, Allentown, PA (US); David Lubkeman, Cary, NC (US); Joe G. Mazza, Bethlehem, PA (US); Khoi Vu, Apex, NC (US)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 11/555,393

(22) Filed: Nov. 1, 2006

(65) Prior Publication Data

US 2008/0103732 A1 May 1, 2008

(51) Int. Cl.
*G06F 7/00* (2006.01)
(52) U.S. Cl. .................... 702/183; 702/182; 702/188; 709/220; 709/221; 709/222; 709/223; 709/228; 707/6; 707/E17.001; 707/E17.005; 707/E17.006
(58) Field of Classification Search .................. 702/183, 702/182, 188; 709/220, 221, 222, 223, 228; 707/6, E17.001, E17.005, E17.006, 204; 710/10, 316
See application file for complete search history.

(56) References Cited

U.S. PATENT DOCUMENTS

| | | | |
|---|---|---|---|
| 4,777,381 A | 10/1988 | Fernandes | |
| 5,490,134 A | 2/1996 | Fernandes et al. | |
| 5,604,892 A | 2/1997 | Nuttall et al. | |
| 6,516,326 B1 | 2/2003 | Goodrich et al. | |
| 6,618,647 B1 | 9/2003 | Yamauchi | |
| 6,618,745 B2 * | 9/2003 | Christensen et al. | 709/201 |
| 6,671,654 B1 * | 12/2003 | Forth et al. | 702/182 |
| 6,961,753 B1 * | 11/2005 | Osburn, III | 709/203 |
| 7,043,381 B2 | 5/2006 | Wakida et al. | |
| 7,062,359 B2 | 6/2006 | Bjorklund | |
| 7,085,824 B2 * | 8/2006 | Forth et al. | 709/221 |
| 7,233,843 B2 | 6/2007 | Budhraja et al. | |
| 7,409,303 B2 * | 8/2008 | Yeo et al. | 702/60 |
| 2002/0035497 A1 | 3/2002 | Mazereeuw et al. | |
| 2002/0120723 A1 * | 8/2002 | Forth et al. | 709/221 |
| 2002/0194547 A1 * | 12/2002 | Christensen et al. | 714/43 |
| 2003/0006915 A1 | 1/2003 | Kauppila et al. | |
| 2003/0144803 A1 | 7/2003 | Wakida et al. | |

(Continued)

FOREIGN PATENT DOCUMENTS

WO WO2006029312 A1 3/2006

OTHER PUBLICATIONS

Advance Control Systems, Inc. Substation Automation Product Overview, Mar. 2003, 2 pages, www.acsatlanta.com.

(Continued)

*Primary Examiner*—Carol S Tsai
(74) *Attorney, Agent, or Firm*—Paul R. Katterle; Driggs, Hogg, Daugherty & DelZoppo Co. L.P.A.

(57) ABSTRACT

A substation intelligence system (104) includes a substation computer (105) which is operatively connected to a plurality of field devices (102) through an input/output subsystem (204). Data indicative of the devices is stored in a substation database (208). Advanced monitoring and/or diagnostics (107) use information from the database to perform various monitoring and/or diagnostic functions.

16 Claims, 6 Drawing Sheets

U.S. PATENT DOCUMENTS

| | | | |
|---|---|---|---|
| 2004/0122833 A1* | 6/2004 | Forth et al. | 707/100 |
| 2004/0158360 A1* | 8/2004 | Garland et al. | 700/286 |
| 2004/0225649 A1* | 11/2004 | Yeo et al. | 707/3 |
| 2004/0236620 A1* | 11/2004 | Chauhan et al. | 705/9 |
| 2005/0143941 A1* | 6/2005 | Forth et al. | 702/61 |
| 2005/0182979 A1* | 8/2005 | Gross et al. | 713/300 |
| 2006/0116794 A1* | 6/2006 | Stoupis et al. | 700/286 |
| 2006/0230394 A1* | 10/2006 | Forth et al. | 717/168 |
| 2007/0096765 A1* | 5/2007 | Kagan | 324/765 |
| 2008/0046205 A1* | 2/2008 | Gilbert et al. | 702/62 |

OTHER PUBLICATIONS

Kreiss Johnson Technologies, Inc., Open advancing substation automation, 2003, 13 pages, www.kjt.com.

David Kreiss, Non-Operational Data: The Untapped Value of Substation Automation, Utility Automation & Engineering T&D, 2003, 4 pages, Sep./Oct. 2003 edition, http://uaepl.pennnet.com/Articles/Articles_Display.cfm?Section=ONART&Catagory=PRODJ&PUBLICATION_ID=22&ARTICLE_ID=192304&VERSION_NUM=3.

Kreiss et al., Utilities Can Enhance Bottom Line by Leveraging Non-Operational Data, Utilities Automation & Engineering T&D, Nov. 2003, 4 pages, Nov./Dec. 2003 edition, http://uaelp.pennnet.com/Articles/Article_Display.cfm?Section=ARCHI&ARTICLE_ID=195081&VERSION_NUM=1&p=22.

McArthur, et al., Multi-Agent System for Diagnostic and Condition Monitoring Applications, Power Engineering Society General Meeting 2004, Jun. 2004, pp. 50-54, vol. 1, http://ieeexplore.ieee.org/xpl/absprintf.jsp?arnumber=137251&page=FREE.

Luo et al., Fault Analysis Based on Integration of Digital Relay and DFR Data, Power Engineering Society General Meeting 2005, Jun. 2005, pp. 746-751, vol. 1, http://ieeexplore.ieee.org/xpl/absprintf.jsp?arnumber=148941&page=FREE.

Kezunovic et al., Enhanced Reliability of Power System Operation Using Advanced Algorithms and IEDs for On-Line Monitoring, Part 1 of Final Project Report, Oct. 2005, 78 pages, Power Systems Engineering Research Center.

Erich W. Gunther, On Creating a New Format for Power Quality and Quantity Data Interchange, downloaded Oct. 27, 2006, 5 pages, http://grouper.ieee.org/groups/1159/3/docs/pqdif.pdf.

Written Opinion of ISA, PCT/US2007/022551, published Feb. 27, 2008, James Stoupis et al.

Intl Search Report, PCT/US2007/022551, published Feb. 27, 2008, James Stoupis et al.

* cited by examiner

ELECTRICAL SUBSTATION MONITORING AND DIAGNOSTICS

BACKGROUND

The present application relates to the monitoring and diagnostics of assets used in electrical power distribution. It finds particular application to substation automation, distribution automation, feeder automation, and similar systems and to the monitoring and diagnosis of equipment relevant to the electrical substation and related environments.

The electric utility industry operates under an asset intensive, continuous production business model. Indeed, the generation, transmission and distribution of electricity typically requires a great deal of relatively high value, specialized equipment. While this equipment can be expensive to purchase and maintain, its continued, reliable operation is vital to the uninterrupted supply of energy to home, industrial, commercial and other consumers of electrical power.

Substations, which are an important component of the electrical power distribution system, typically contain or are otherwise dependent upon a number of critical assets. These assets include items such as transformers, circuit breakers, IEDs, substation batteries and battery chargers, capacitor banks, and underground cables, to name but a few. Optimizing the maintenance, repair, and replacement of these and other assets can be a challenging task, particularly when viewed in the larger context of system reliability.

One trend has been the use of microprocessor based data gathering, control and protective relays which are commonly referred to as intelligent electronic devices (IEDs). Depending on the function of a particular IED, IEDs typically allow the configurable protection of assets, read detailed load and/or specific asset data, and provide the ability to control the state of the power system over communication channels using a variety of protocols. The protective relays are commonly used to protect the assets from situations beyond the design limits of the asset which may lead to damage of the asset due to a fault. In addition, these protective relays can be used to control power system equipment such as to locally or remotely trip or close circuit breakers, change tap positions on tap changers, operate capacitor banks, and the like. In addition to controlling the operation of a particular piece of equipment, IEDs typically provide outputs indicative of the status of the IED and its associated equipment.

As will be appreciated, however, the various assets and related monitoring equipment can generate large volumes operational and non-operational data. Examples of operational data include information such as voltage, current, breaker status, and other information which is used to monitor and control the operation of the substation and other elements of the transmission and distribution system on a substantially real time basis. Example of non-operational data includes analytical data (e.g., digital fault records target records, load profiles, power quality, sequence of events, and the like), equipment condition information (e.g., equipment temperature, dissolved gasses, operating and response times, and so on), and temperature, rainfall, and other ambient condition information. As will be appreciated, both operational and non-operational data can have substantial value for monitoring and analyzing the operation of a particular asset.

Another trend has been the development substation automation (SA) systems. Beyond their specific roles, these systems serve as a collection point for information from the various IEDs, monitors, and other equipment associated with a substation. This information, which is often stored on a computer server associated with the SA system, can be useful in understanding the operating status and history of the various pieces of equipment associated with the substation. Unfortunately, however, it can be difficult to organize and analyze the large volumes of information from these disparate sources in a coordinated way.

Consequently, there remains room for improvement. More specifically, it remains desirable to use the information available from the SA system more effectively, especially in connection with the maintenance, repair, or replacement of equipment relevant to the substation environment.

SUMMARY

Aspects of the present application address these matters, and others.

According to one aspect, a computer readable storage medium containing instructions which, when executed by a computer, cause the computer to carry out a method. The method includes using data from a database of an substation intelligence system to perform at least one of a substation monitoring and a substation diagnostic function and storing an output of the function in the database.

According to another aspect, an apparatus includes an substation intelligence system which includes a field device interface, a computer readable memory containing data indicative of a plurality of field device, and a substation computer operatively connected to the field device interface and the memory. The apparatus also includes a component which uses data from the memory to perform at least one of a first diagnostic function and a first monitoring function, wherein the component generates data which is stored in the computer readable memory as virtual device data.

According to another aspect, a method includes obtaining data relevant to a field device from a plurality of different data structures in a substation intelligence system database and storing the data in a single data structure in the substation intelligence system database.

According to another aspect of the application, an apparatus includes means for receiving data from a plurality of electrical substation field devices, means for storing the received data in a substation intelligence system database, means for using data from the database to evaluate a condition of the substation, means for storing a result of the analysis in the database, and means for communicating information contained in the database to at least one of a SCADA system or an enterprise computer system.

Those skilled in the art will appreciate still other aspects of the present application upon reading and understanding the attached figures and description.

FIGURES

The present application is illustrated by way of example and not limitation in the figures of the accompanying drawings, in which like references indicate similar elements and in which.

DESCRIPTION

Figure 1:
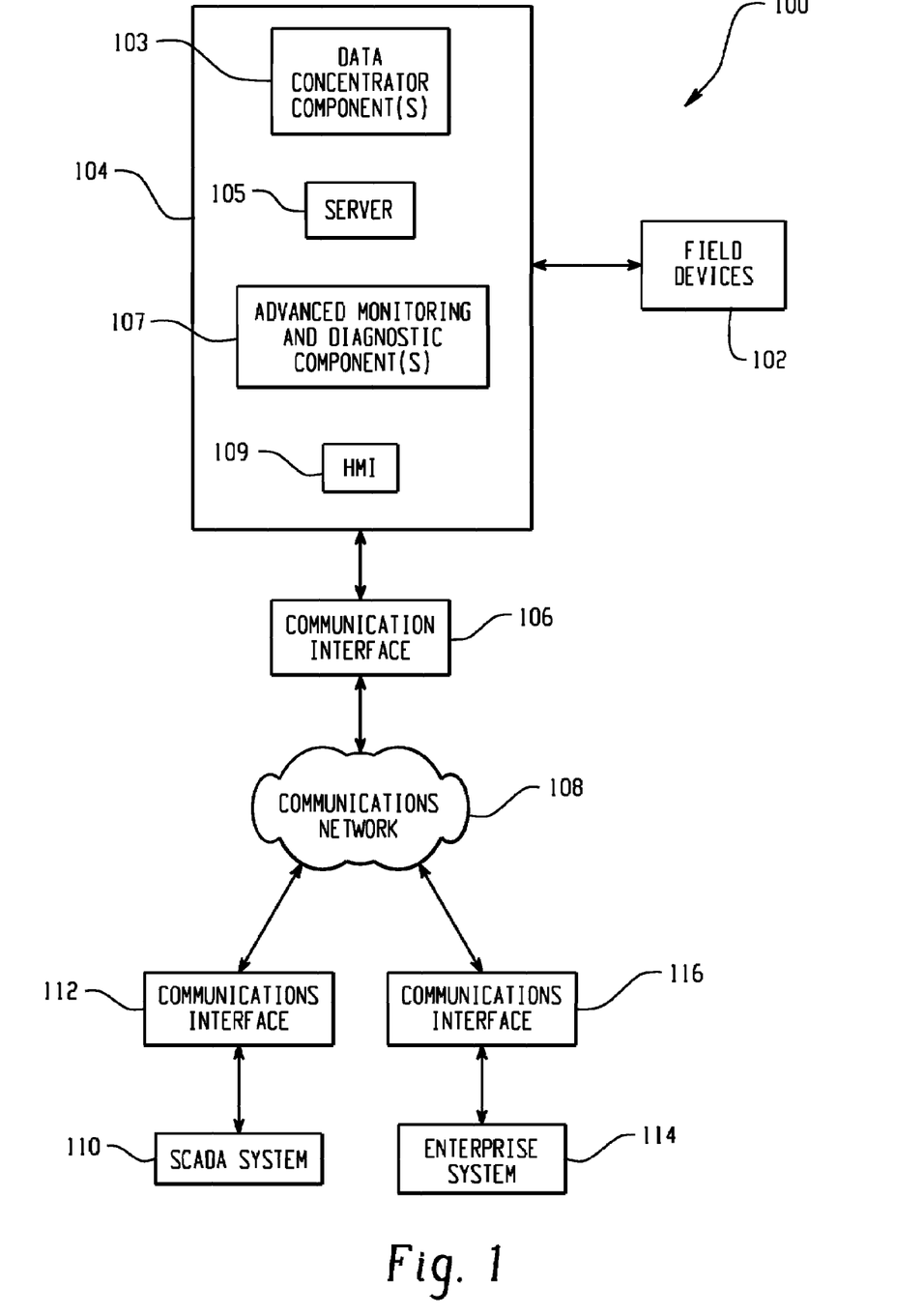
FIG. 1 depicts components of an electrical power distribution system.

With reference to FIG. 1, a substation 100 includes a plurality of field devices 102, a substation intelligence system 104, and a communication interface 106. The field devices 102 include equipment and other assets as are typically encountered in the substation environment. Examples include devices located in or otherwise generally in the vicinity of a substation such as one or more of IEDs, digital fault recorders (DFRs), circuit breakers (CB), transformers (TX), feeders, distribution equipment, capacitor banks, other condition monitoring devices, and the like.

The field devices 102 are operatively connected to the substation intelligence system 104. Depending on the architecture of a given system, the intelligence system 104 may include one or more of a substation automation system, a feeder automation system, or a distribution automation system. The substation intelligence system 104 includes a server or other computer 105, one or more data concentrator components 103, one or more advanced monitoring and/or diagnostic components 107, and an optional human machine interface (HMI) 109. As will be described further below, the data concentrator components 107 compile data relevant to the condition of one or more field devices 102 or other equipment relevant to the substation, The monitoring and diagnostic components 107 provide monitoring, diagnostic, and/or similar functionality.

The communication interface 106 connects the substation intelligence system 104 to a wide area network (WAN), the internet, or other communications network(s) 108.

A supervisory control and data acquisition (SCADA) system 110 connects to the communications network 108 via suitable communications interface(s) 112. The SCADA system 110 is typically located remotely from the substation 100 and provides supervisory control functions for a plurality of substations 100 and/or other components of the power generation and distribution system.

The substation intelligence system 104 may also be connected to one or more enterprise computer systems such as data warehouses, data marts, planning systems, geographic information systems (GIS), or centralized maintenance management systems (CMMS) 114, which are likewise connected to the communications network 108 through communication interfaces 116.

Figure 2:
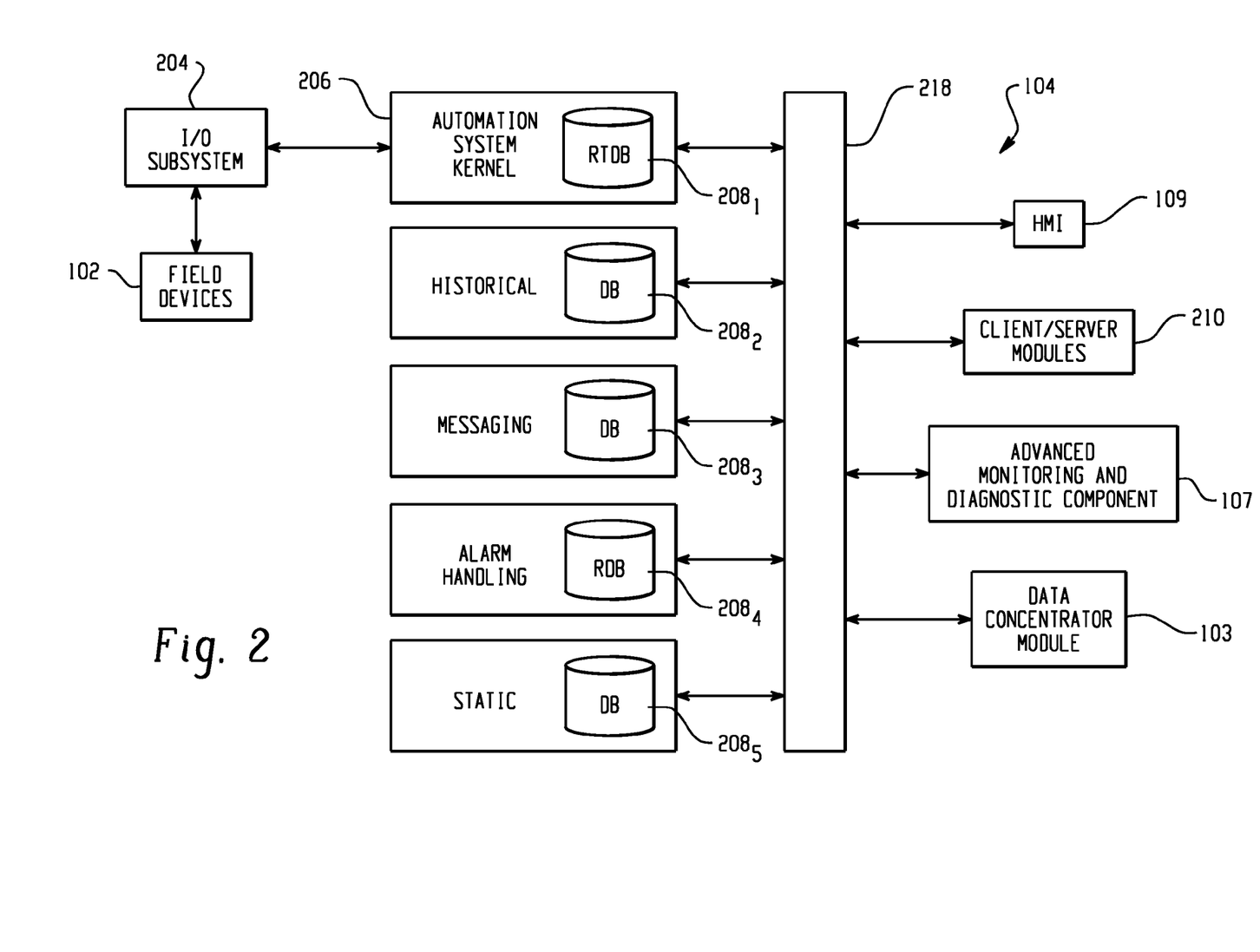
FIG. 2 depicts a substation intelligence system.

FIG. 2 depicts the interaction between the field devices 102 and the substation intelligence system 104 in greater detail. As will be appreciated, the various field devices 102 provide operational and non-operational data on equipment relevant to the substation environment. Examples of this data include analog data, digital data, load profile data, oscillographics, fault records, operations records, and configuration and other settings.

By way of example, analog data may include, information such as current, voltage, power, reactive power (i.e. VARs), and power factor. Examples of digital data include logical inputs, logical outputs, digital inputs (e.g., circuit breaker or other equipment status), and digital outputs (e.g., trips and alarms).

Load profile data may include information on load current and other values as a function of time. Examples of oscillographics include voltage and current waveform samples, especially relating to fault conditions and other disturbances. Fault records typically include data relating to various faults, such as fault location, timestamp data, fault voltage, fault current, and the like.

Operations records typically include information relating to equipment operation. This information may include, for example, the operations of circuit breakers or other equipment, sequences of events surrounding a fault or disturbance, and the like. Settings typically include configuration or other information relating to adjustable parameters of a field device 102. In the context of an IED, for example, such settings may include protection, configuration, and reclosing settings.

Of course, those of ordinary skill in the art will appreciate that the foregoing are non-limiting examples of the field devices 102 and signals typically available in the substation environment. Still other field devices 102, types of signals, and signals may be encountered depending on the configuration of a particular substation 100.

An input/output (I/O) subsystem 204 provides the necessary drivers and other interface functionality needed to transfer information to and from the various field devices 102. The I/O subsystem 204 is operatively connected to an automation system kernel 206, which is typically resident on the server 105. Among other functions, the kernel 206 manages the storage of I/O and other substation-related information in one or more databases 208 which are maintained in computer readable memory accessible to the server 105 or otherwise associated with the substation intelligence system 104. In addition, the kernel 206 initiates the modules 107 upon recognizing a specific trigger leading to the creation of advanced information or otherwise polls the modules as desired.

As illustrated in FIG. 2, the database 208 includes a real time database (RTDB) $208_1$, a historical database $208_2$, a messaging database $208_3$, an alarm handling database $208_4$, and a static database $208_5$. The real time database $208_1$ includes real or substantially real time information relating to the status of the substation 100 and the relevant field devices 102. The historical database $208_2$ contains information having less temporal recency such as historical or archival information, while the messaging database $208_3$ contains information indicative of inter-task communications data exchange between tasks sharing or needing data and other messages relevant to the automation system. The alarm handling database $208_4$ contains information relating to various alarms and other fault conditions. The static database $208_5$ contains substantially time invariant information such as the network model (e.g., network topology, line impedance loads, and like information), equipment design and configuration information and the like.

Still additional or different databases may also be provided depending on application specific requirements. While the foregoing is illustrative of one possible database 208 structure, other structures are contemplated. For example, one or more of the databases $208_n$ may be consolidated in a single database, further subdivided, or otherwise differently organized.

To gain efficiencies, the internal software design is typically client/server based. An internal task needing or requesting data from another task is ordinarily referred to as a client. An task providing data is referred to as a server. As can be appreciated, some tasks are pure clients and some are pure servers. Also, some tasks perform both client and server functions. The clients are typically driven by either a timer (timed polling) or trigger based (interrupting mechanism). Client/server software modules 210 residing on the server 105 provide desired functionality. Thus for example, a client module 210 may from time-to-time poll a particular field device 102 to obtain information relating to its status, with the data being stored at an appropriate location in the database 208. As another example, another client module may generate an alarm or fault log, with the resulting information again stored at an appropriate location in the database 208. As the operation of the substation is a continuous process, it will be appreciated that many of the client modules operate on a real or substantially real time basis.

With continuing reference to FIG. 2, one or more data concentrator components 103 collect data relevant to the diagnosis and/or monitoring of various field devices 102. As noted above, the field devices 102 tend to generate large volumes of data. Unfortunately, this information tends to be organized in multiple, non-integrated data sets which are difficult to analyze in any coordinated way.

Viewed from one perspective, the data concentrator components may be viewed as virtual instruments which occupy a position in the system architecture which generally parallels that of the client modules 210. The data concentrator components 103 collect data relevant to the monitoring and/or diagnosis of a particular field device 102 from the various disparate data sets. Depending on the structure of a given automation system the data may be obtained from a number of sources, for example from the one or more of the databases 208, one or more field devices 102, the SCADA system 110, or data input by a human via the HMI 109 or otherwise. The data concentrator component 103 uses the collected information to generate a field device-centric data structure for storage in the database 208 or other suitable computer readable memory.

With still further reference to FIG. 2, one or more monitoring and diagnostic components 107 provide advanced diagnostic and/or monitoring functionality. The monitoring and diagnostic components 107 may likewise be viewed as virtual instruments which occupy a position in the system architecture which generally parallels that of the client modules 210 and the data concentrator modules 103. Again depending on the functionality of a particular component 107, one or more outputs of a component 107 may be provided to the substation intelligence system 104, for example by storing the output(s) at an appropriate location in the database 208.

The HMI 109, which may be implemented in a software layer or otherwise in software which is distinct from that of the various components 103, 107 or modules 210, provide desired operator interface functionality, for example to allow a user to interact with the client modules 210, the data concentrator components 103, the monitoring and diagnostic components 107, the database 208, or other components of the substation intelligence system 104. In one implementation, the HMI 109 is implemented as software or other computer readable instructions which implement a graphical user interface (GUI) on a suitable computer. User interfaces implemented in connection with the SCADA system 110 or the enterprise system 114, if any, may also allow a user to mine the data from one or more sources or otherwise provide desired HMI functionality.

The various components of the system communicate over a software bus 218. Though omitted from FIG. 2 for clarity of illustration, suitable drivers or other adapters may be provided to ensure communications compatibility between system components which implement differing communications protocols. While the components 103, 107 may be implemented as software programs or modules which are stored in a computer readable memory accessible to and executed by the server 105, the components 103, 107 may be executed by one or more additional computers or processors which access the software bus 218 and/or the database 208 via a suitable interface. Note also that some or all of the functionality may be implemented in hardware.

Figure 3A:
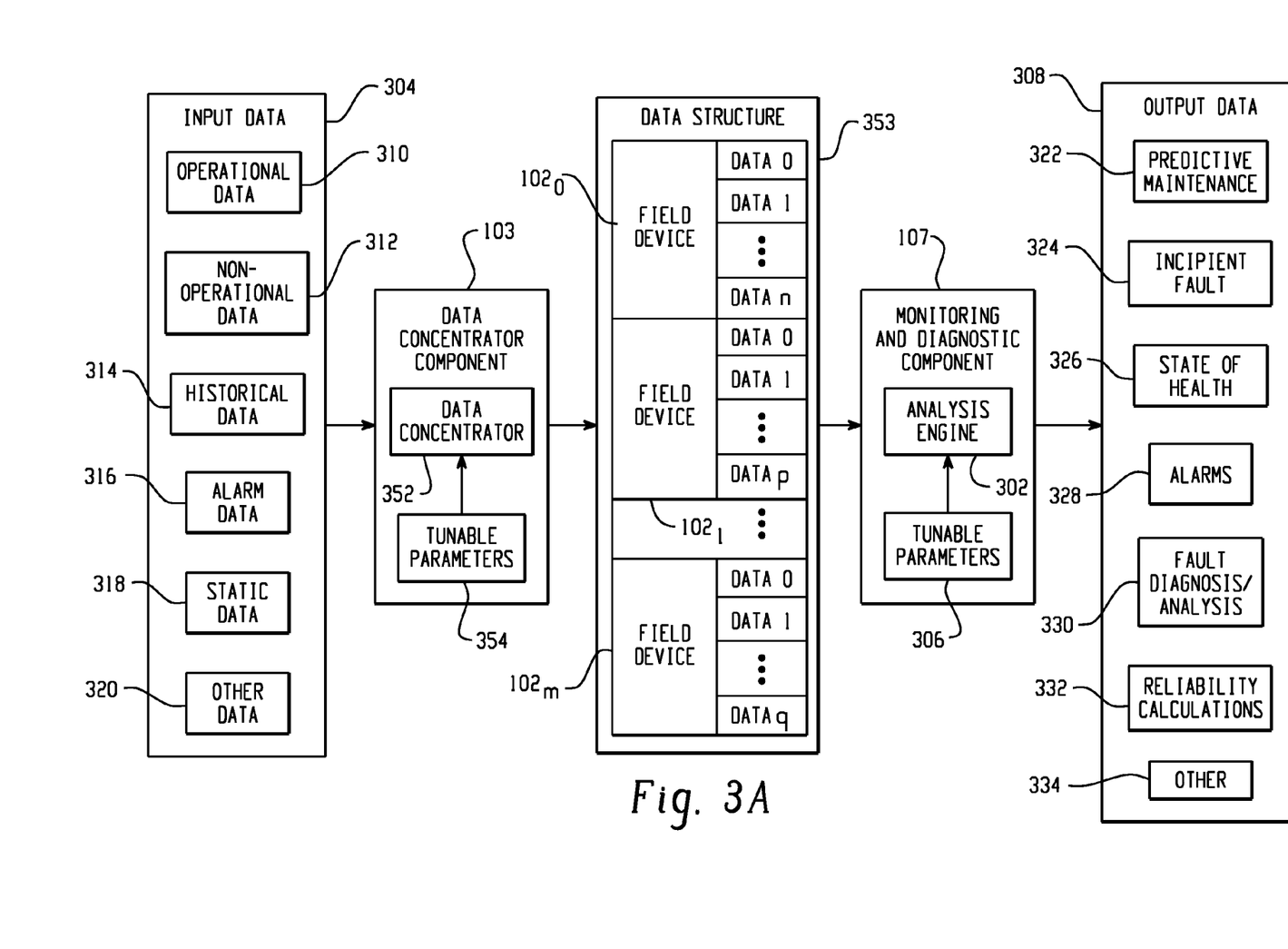
FIG. 3A depicts a data concentrator module and a monitoring and diagnostics module.

A functional block diagram of an exemplary data concentrator component 103 and monitoring and diagnostic component 107 is shown in FIG. 3A. As illustrated, the data concentrator component 103 includes a data concentrator 352 which obtains input data 304 relevant to one or more field devices 102 and generates an output data structure 353. To further facilitate the organization of data from multiple sources, the data concentrator may also perform a data normalization function, for example so that the data structure conforms to that of the substation intelligence system 104 or to another proprietary or non-proprietary data structure. The data concentrator component 103 also includes one or more tunable parameters 354 which identify the relevant field device(s) 102, their number and location of the input data sources and the required output data, the times or circumstances under which data should be obtained, or other relevant information. Depending on the implementation, the tunable parameters 354 may be established in connection with the design of the data concentrator component 103, by the user via the HMI 109, adaptively by the data concentrator component 103 or the substation intelligence system 104 based on operational experience, or otherwise.

The input data 304, which is typically obtained from the database 208, may include data generated by one or more of the other data concentrator components 103, monitoring and diagnostic components 107, client modules 210, or other sources. Exemplary input data includes as operational data 310, analytical, equipment condition, ambient condition, and other non-operational data 312, historical data 314, alarm data 316, static data 318, and other data 320, with the number and type of inputs varying based on the function of a particular concentrator component 103. As will be appreciated, some or all of the input data may be located in disparate structures in different of the databases $208_{1-5}$.

In this regard, it should be noted that the data 304 may include data from other field device(s) 102 which bear on the operation of the particular field device 102. Moreover, the input data 304 may include data generated by one or more other data concentrator components 103, monitoring and diagnostic components 107, or client components 210.

As illustrated, the output data structure 353 is organized by field device 102. Thus, for a particular field device, the data structure may include one or more of operational data, non-operational data, historical data, alarm data, static data, and other data. The data structure 353 may also include pointers to the relevant data. As illustrated in FIG. 3A, the data structure 353 generated by a particular concentrator module 103 may also contain data indicative of a plurality of field devices 102.

As illustrated in FIG. 3A, the component 107 includes an analysis engine 302 which analyzes input data 304 and generates output data 308. The analysis engine 302, which is advantageously implemented using one or more software or firmware routines, applies a desired analysis and/or monitoring algorithm to the input data 304 to generate desired module output data 308. Various analysis algorithms are contemplated. For example, the engine 302 may implement one or more of rule based, neural network, expert system, analytical, heuristic, or other suitable algorithms.

One or more tunable parameters 306 may also be provided, for example to tune the performance of the analysis engine 302, define the number and source of the inputs 304 and/or outputs 308, and the like.

As illustrated in FIG. 3A, the desired input data is obtained from the data structure 353. In this regard, it should also be noted that the input data may be obtained from more than one data structures.

The output data 308 may include one or more of predictive maintenance data 322, incipient fault data 324, state of health data 326, alarm data 328, fault diagnosis and/or analysis data 330, reliability calculations 332, or other data 334. Again by way of example, predictive maintenance information 322 may include a suggestion to perform periodic maintenance of a particular field device 102 based on actual operating experience. In the case of a feeder cable, for example, incipient fault data 324 may include information relating to an emerging or predicted fault condition. State of health information 326 for a battery, for example, may include state of charge or similar information. Alarms 328 may include not only alarms related to data from a single field device 102, but also to alarms generated from information from disparate sources which might bear on the device 102. Fault diagnosis and analysis information 330 may be used to provide information on a particular fault, for example a location or root cause of a fault. Reliability calculations for a feeder, for example, may include information such as SAIDI, SAIFI, CAIDI, and MAIFI. Note also that the output data 308 may be used as inputs 304 to one or more data concentrator components 103 or still other components 107. The output data may also be provided to the data structure 353.

Those of ordinary skill in the art will appreciate that the foregoing are merely examples of possible inputs 304 and outputs 308, and that, depending on its functionality, a particular component 103, 107 may operate on a subset of such inputs 304 and outputs 308. It will also be appreciated that the components 103, 107 may be used in connection with a variety of functions, including but not limited to battery monitoring, IED-based monitoring, circuit breaker diagnosis, and transformer gas diagnosis. Examples of IED-based monitoring include cable system diagnostics, distribution fault locations, reliability indices, feeder voltage/VAR monitoring, and unbalanced capacitor switching.

Figure 3B:
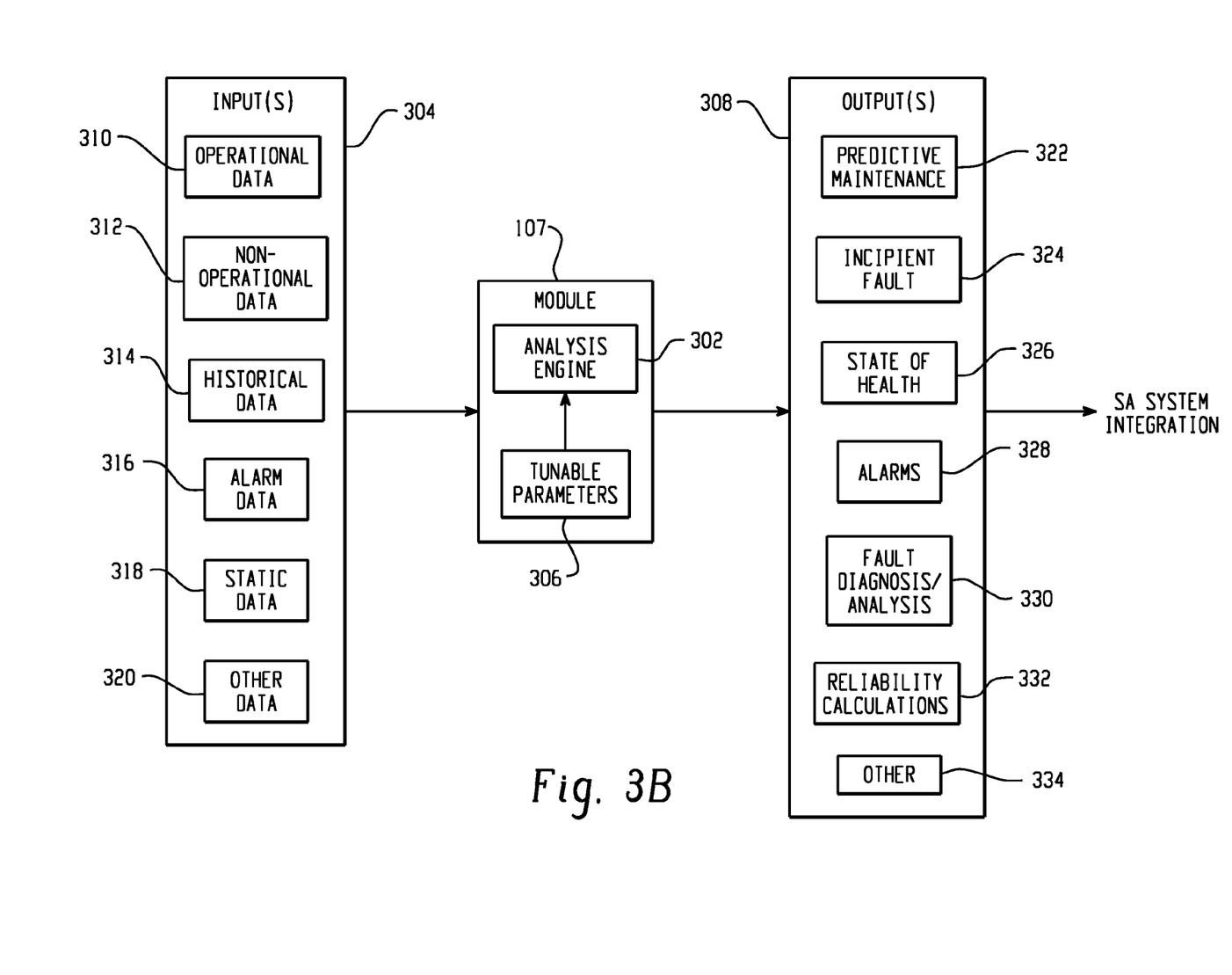
FIG. 3B depicts a monitoring and diagnostics module.

Turning now to FIG. 3B, a monitoring and diagnostic component 107 may obtain data directly from the appropriate source. In such an implementation, the data concentrator 103 may be omitted. The data concentration, monitoring, and/or diagnostic functionality may be combined in a single component so that a given component generate both raw and analyzed data. Where monitoring or diagnostic functionality is not required, the component 107 may also be omitted.

Figure 4:
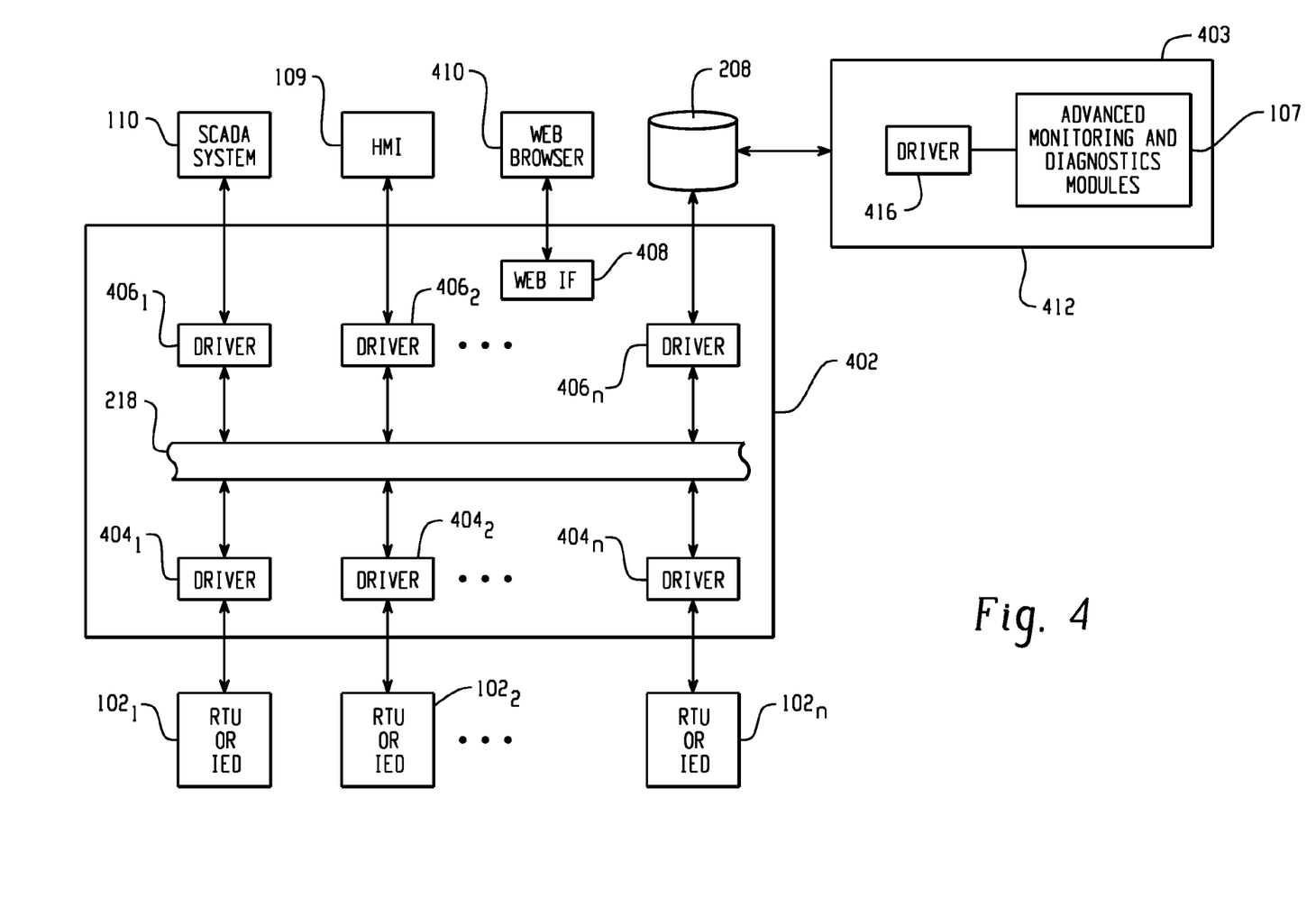
FIG. 4 depicts a substation automation system.

Turning now to FIG. 4, a substation architecture which includes separate substation 402 and monitoring and/or diagnostic 403 software platforms is shown. As illustrated, the substation software platform 402 includes a software bus 218, one or more field-side drivers $404_1, 404_2, \ldots 404_n$, one or more client-side drivers $406_1, 406_2, \ldots 406_n$, and a web interface 408. The field side drivers 404 provide necessary interface functionality for communicating with various field devices 102 such as remote termination units (RTUs) or IEDs. The client-side drivers 406 provide necessary interface functionality for communicating with devices such as the SCADA system 110, one more HMIs 109, and the database. In the case of a web based HMI 410, a web interface 408 provides the necessary interface functionality. The diagnostic software platform 403 includes one or more monitoring and/or diagnostic software components 107, and one or more drivers 412 which provide necessary protocol conversion for functionality for communicating with the database 208. One or more data concentrator modules 103 may also reside on the software platform 403.

In one implementation, the software platform resides on the substation server 105, while the diagnostic software platform 403 resides on a separate computer or processor located at the substation 100 and which communications with the substation server over a local area network (LAN) or other communication interface. Note that the processor may also access the software bus 218 or the field devices 102 directly through suitable drivers. Requisite hardware drivers are omitted from FIG. 4 for clarity of illustration.

Variations are contemplated. For example, and depending on the architecture of and nomenclature used to describe a particular substation intelligence system 104, the substation intelligence system 104 may include one or more such systems. In one such implementation, the substation intelligence system 104 is organized along functional lines. Thus, for example, a given substation intelligence system 104 may include one or more of a feeder automation system, a distribution automation system, or other automation systems. In this regard, it should also be noted that the substation intelligence system 104 may be configured to automate only a portion of the equipment relevant to the substation environment, for example to provide only transformer or circuit breaker automation, a feeder automation, distribution automation, or other desired equipment automation. In still other implementations, the substation intelligence system 104 may be partitioned according to location, number or criticality of the data points or equipment, or other relevant factors.

Some or all of the database 208 may be located remote from the substation 100. The database 208 may also be replicated at a remote location. Moreover, the data from two or more substation intelligence systems 104 may also be consolidated or otherwise stored in a data storage system such as a data warehouse or data mart. In such implementations, the modules 107 are advantageously executed using a server or other computer 105 which has access to the required data. In this regard, it should be noted that some or all of the substation intelligence system 104 functionality may be located remote from the substation 100. Note that the monitoring and/or diagnostic software platform 403 may also execute on computer or other processor which is located remote from the substation 100.

In still another variation, the data concentrator components 107 are located at the substation or other field location, with the advanced monitoring and diagnostic components are located at a remote location, such as an office or other field location. According to such an implementation, the relevant data structures 353 are transferred to the remote location over a suitable communication interface. A particular advantage of such an arrangement is that the data structures 353 are typically only a subset of the larger database 208, thereby reducing the required communications bandwidth.

Figure 5:
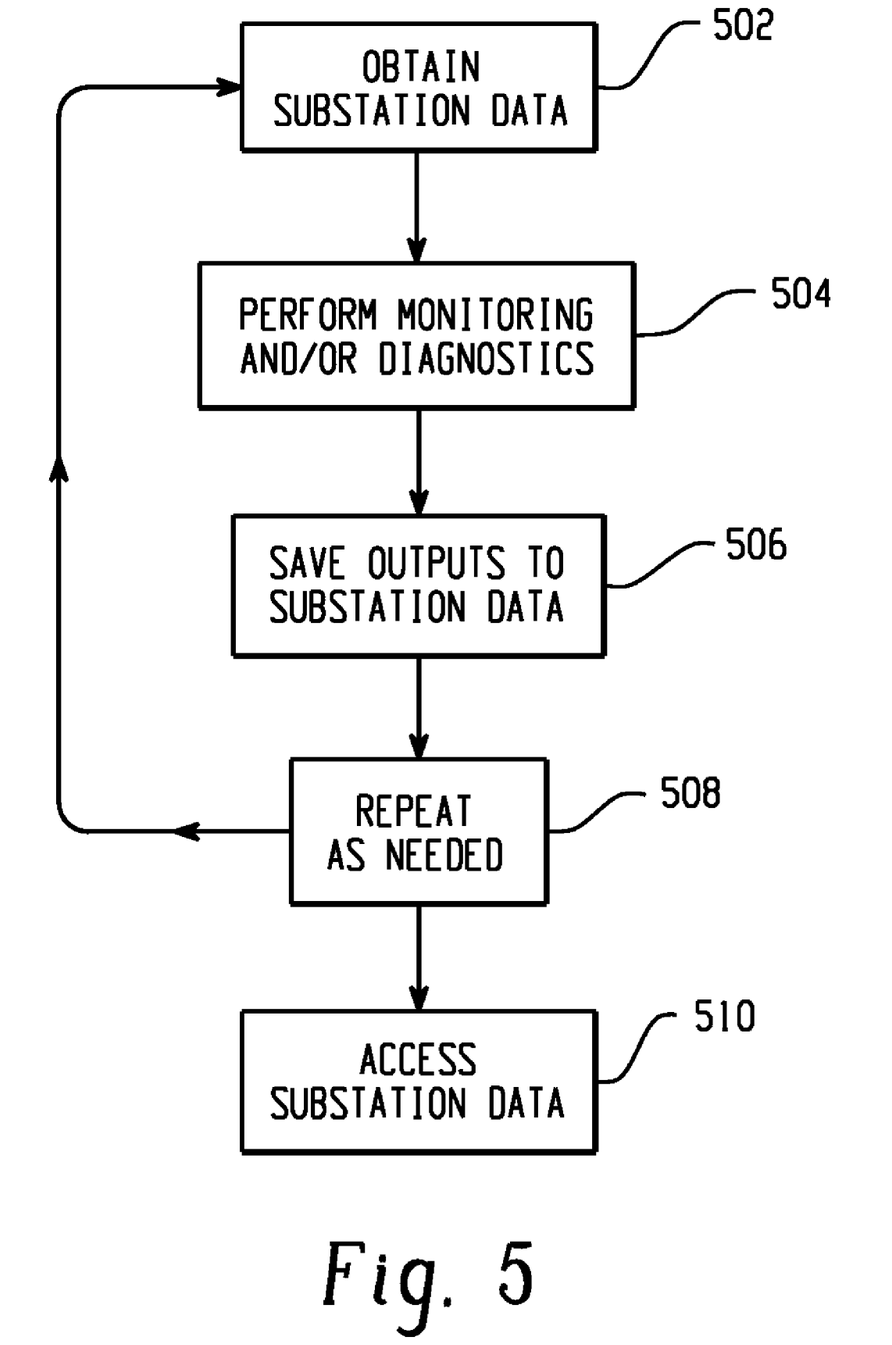
FIG. 5 depicts a method of monitoring and diagnosis.

Operation will be described in relation to FIG. 5.

Substation data is obtained at step 502. As discussed above, the substation intelligence system 104 periodically polls or otherwise from time to time receives data indicative of the substation 100 and the relevant field devices 102. The relevant data is stored in the database 208.

At step 504, the substation data is used to perform the desired monitoring and/or diagnostic functions, for example by executing one or more of the diagnostic components 107. Where the substation data is stored in the database 208, the data concentrator module(s) 103 and/or the monitoring and diagnostic module(s) 107 retrieve the information therefrom. Alternately, the modules may obtain the data directly from the relevant field devices 102. Note that one or more client modules 210 may also be executed.

At step 506, the relevant output(s) are saved to the database 208, ordinarily in connection with the execution of each of the various modules.

At step 508, the process is repeated as desired.

The substation data is accessed at step 510. For example, a user may elect to access the data via a local HMI 109, a remote HMI, an HMI associated with the SCADA system 110, enterprise system 114, or otherwise. The substation data may also be accessed from time to time by the SCADA system 110, the enterprise system 114, or other computer. Where the outputs of the various components 103, 107 are stored in the database 208 in a manner similar to the data from the field devices 102 or the client modules 210, the components 103, 107 can be treated as virtual devices, and the data accessed accordingly. A particular advantage of such an arrangement is that an existing data and HMI structures may be leveraged, if desired, thus obviating the need for creating and/or maintaining structures parallel to those which may already exist in the context of a particular substation intelligence system 104. Note that the data may be accessed temporally in parallel with steps 502, 504, and 506.

Of course, modifications and alterations will occur to others upon reading and understanding the preceding description. It is intended that the invention be construed as including all such modifications and alterations insofar as they come within the scope of the appended claims or the equivalents thereof.

What is claimed is:

1. A tangible computer readable storage medium containing instructions which, when executed by a computer, cause the computer to carry out a method comprising:

retrieving data relevant to a first field device from a plurality of different databases in a substation intelligence system database system;

storing the retrieved data relevant to the first field device in a single data structure in the substation intelligence system database system;

retrieving data relevant to a second field device from the different databases in the substation intelligence system database system; and storing the retrieved data relevant to the second field device in the data structure; and wherein the retrieved data relevant to the first field device is stored in a first data unit within the data structure and the retrieved data relevant to the second field device is stored in a second data unit within the data structure.

2. The computer readable storage medium of claim 1 wherein the method further comprises communicating information from the database system to a human machine interface over a communications network.

3. The computer readable storage medium of claim 1, wherein the retrieved data relevant to the first and second field devices includes real time data.

4. The computer readable storage medium of claim 3 wherein the retrieved data relevant to the first and second field devices includes non operational data relating to a condition of one of the first and second field devices.

5. The computer readable storage medium of claim 3 wherein the retrieved data relevant to the first and second field devices includes at least one of historical data and alarm data.

6. The computer readable storage medium of claim 1 wherein the one or more analysis functions includes a field device predicative maintenance identification function.

7. The computer readable storage medium of claim 1 wherein the one or more analysis functions includes a field device incipient fault identification function.

8. The computer readable storage medium of claim 1 wherein the one or more analysis functions includes a field device reliability index calculation function.

9. The computer readable storage medium of claim 1 wherein the one or more analysis functions includes a fault diagnosis function.

10. The computer readable storage medium of claim 1 wherein the first and second field devices include at least one of an IED, a transformer, a circuit breaker, a feeder cable, and a capacitor bank.

11. The computer readable storage medium of claim 1 wherein the computer readable storage medium is part of a substation intelligence system that includes one or more of a substation automation system, a distribution automation system, and a feeder automation system.

12. A method comprising:

retrieving data relevant to a first field device from a plurality of different databases in a substation intelligence system database system;

storing the retrieved data relevant to the first field device in a single data structure in the substation intelligence system database system;

retrieving data relevant to a second field device from the different databases in the substation intelligence system database system; and storing the retrieved data relevant to the second field device in the data structure; and wherein the retrieved data relevant to the first field device is stored in a first data unit within the data structure and the retrieved data relevant to the second field device is stored in a second data unit within the data structure.

13. The method of claim 12 further comprising performing at least one of a substation monitoring function and a substation diagnostic function using the stored data.

14. The method of claim 13 wherein the performance of the at least one function occurs at a remote location, and wherein the method further comprises transferring the stored data to the remote location over a wide area network.

15. The method of claim 12 wherein the data structure includes operational and non-operational data.

16. The method of claim 12 wherein storing includes storing the data structure in a computer readable memory located at the substation.

* * * * *